United States Patent [19]

Holmes

[11] 4,143,397
[45] Mar. 6, 1979

[54] COMB FILTER APPARATUS

[75] Inventor: David D. Holmes, Trenton, N.J.

[73] Assignee: RCA Corporation, New York, N.Y.

[21] Appl. No.: 778,594

[22] Filed: Mar. 17, 1977

Related U.S. Application Data

[63] Continuation-in-part of Ser. No. 678,394, Apr. 19, 1976, abandoned.

[51] Int. Cl.² .............................................. H04N 9/535
[52] U.S. Cl. ....................................................... 358/31
[58] Field of Search ..................................... 358/31, 47

[56] References Cited

U.S. PATENT DOCUMENTS 3,836,707  9/1974  Murakami et al. ..................... 358/31

Primary Examiner—John C. Martin
Attorney, Agent, or Firm—Eugene M. Whitacre; William H. Meagher; Ronald H. Kurdyla

[57] ABSTRACT

A comb filter arrangement for processing video signals containing frequency interleaved image representative luminance and chrominance components provides improved color definition of reproduced images in the presence of chrominance components of adjacent horizontal image lines which differ perceptibly from each other in amplitude or phase. The comb filter comprises at least one signal delay element arranged to provide a delay equal to one horizontal line scanning interval, at least one gain controllable element and sum and difference networks for combining delayed and undelayed video signals to provide relatively separated luminance and chrominance components. A control network coupled to the comb filter provides a control signal representative of the magnitude of signal components within the chrominance signal frequency range for controlling the gain of the gain controllable element. In one embodiment, separated luminance output signals from the sum network are coupled to the control network to detect the presence of contaminating signal components attributable to non-recurrent chrominance components. The gain of at least the difference network is varied in accordance with the magnitude of the detected signal to suppress the effect of the non-recurrent chrominance signals on a reproduced color image.

10 Claims, 8 Drawing Figures

COMB FILTER APPARATUS

This application is a continuation-in-part of application Ser. No. 678,394, filed Apr. 19, 1976, now abandoned.

This invention generally concerns video signal processing apparatus and, more particularly, is directed to an improved comb filter arrangement for a color television system.

In color television systems, such as the system adopted in the United States, luminance and chrominance components of a video signal are disposed in a frequency interleaved relation with the luminance components at integral multiples of a horizontal line scanning frequency (h) and chrominance components at odd multiples of one-half of the line scanning frequency.

Comb filter arrangements are known which separate the frequency interleaved luminance and chrominance components of the video signal.

Where a comb filter is employed, reproduction of a color image tends to be impaired in the presence of chrominance components which do not recur or which change significantly in amplitude or phase in adjacent horizontal lines. For example, such uncorrelated chrominance components can result in the luminance signal output of a comb filter being contaminated by uncancelled color information. Such contamination of the separated luminance output signal is manifested in a reproduced horizontal color image line by a horizontal series of dots. Such dots are shown in FIG. 8 in an article entitled "High Performance Color Television Experiment" by D. H. Pritchard, A. C. Schroeder and W. G. Gibson, appearing in the *IEEE Transactions On Broadcast And Television Receivers*, Volume BTR-18, Number 2, page 82, May 1972. Non-recurring or uncorrelated chrominance components can also impair the fidelity of color signal information provided at a chrominance signal output of a comb filter. In either case, the amount by which color definition of reproduced color images is impaired is related to the amount by which the phase and amplitude of chrominance components of adjacent horizontal line components of the same scanning field are uncorrelated, or differ, from each other.

Apparatus according to the present invention for improving the quality of a reproduced color image comprises a comb filter including means for delaying a video signal for a time period corresponding to a horizontal line scanning interval. The video signal contains image representative luminance and chrominance components disposed within the frequency spectrum of the video signal in frequency interleaved relation. Sum and difference networks combine undelayed and delayed video signals to provide relatively separated luminance and chrominance components. The comb filter includes at least one gain controllable element. A control network with an input coupled to the comb filter is responsive to signal components with frequencies in a range corresponding to that of the chrominance components. The control network provides a control signal representative of the magnitude of such signal components. The control signal is coupled to the gain controllable element for controlling the gain thereof to reduce the effect of uncancelled chrominance signal components on the reproduced image.

Figure 1:
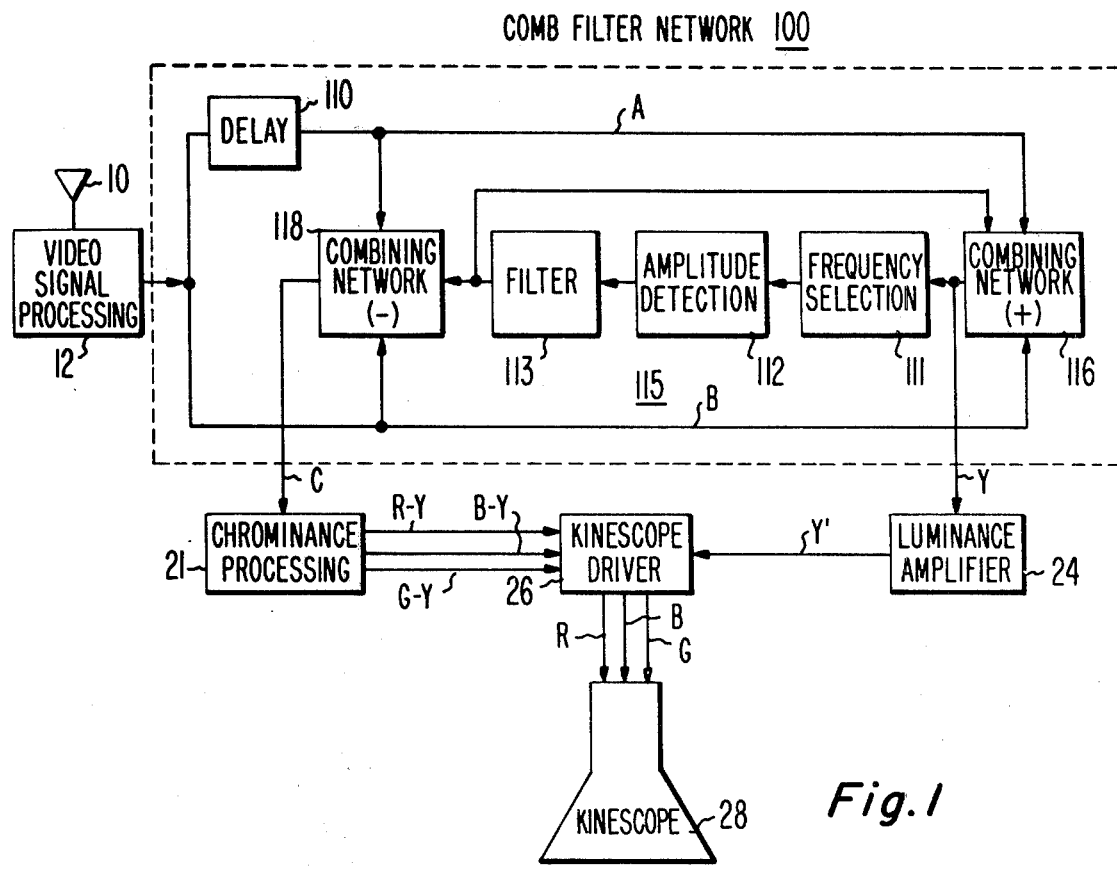
FIG. 1 illustrates a general arrangement of a color television receiver employing a comb filter according to the present invention.

Referring to FIG. 1, a video signal processing unit 12, responsive to radio frequency (RF) television signals received by an antenna 10, produces a video signal comprising chrominance, luminance, sound and synchronizing components by means of conventional television signal processing apparatus. Output video signals from unit 12 are coupled to a comb filter network 100 which provides separated luminance (Y) and chrominance (C) components to a luminance amplifier 24 and to a chrominance processing unit 21, respectively. Luminance amplifier 24 amplifies and processes the separated luminance components to produce an amplified luminance signal Y'. Chrominance processing unit 21 derives color difference signals R-Y, B-Y and G-Y from the separated chrominance component. Outputs from luminance amplifier 24 and chrominance processing unit 21 are coupled to a kinescope driver 26 where they are matrixed to form R, B and G color signals for driving a kinescope 28.

Comb filter 100 comprises a video signal delay device 110 and sum and difference combining networks 116 and 118. Delay device 110 may comprise any suitable device for delaying a video signal, such as an arrangement including an ultrasonic glass or quartz delay line, or an array of charge coupled devices (CCD'S) or charge transfer devices, for example. Delay device 110 exhibits a bandwidth at least as wide as the bandwidth of the video signal, and provides a video signal delay equal to the duration of one horizontal line scanning interval. In the case of a color television signal processor for use in the United States, delay device 110 provides a delay of about 63.5 microseconds, which corresponds to the reciprocal of horizontal line scanning frequency of 15,734 Hz.

Delayed video signals from delay device 110 and direct (undelayed) video signals from unit 12 are coupled to inputs of sum and difference combining networks 116 and 118 via a delayed signal path A and a direct signal path B, respectively. Sum combining network 116 may, for example, comprise a resistive adding matrix coupled to an input of a gain controllable amplifier, and difference combining network 118 may comprise a gain controllable differential amplifier.

In accordance with one aspect of the invention, comb filter 100 also includes a gain control network 115 including a frequency selection unit 111, an amplitude detection unit 112 and a filter unit 113 arranged in cascade between an output of summing network 116 and a control input of difference network 118.

Frequency selection unit 111 selectively passes information in the chrominance signal frequency range and may, for example, comprise an inductance-capacitance (LC) tuned circuit with a bandpass characteristic of about 3.58 ± 0.5 MHz. Detection unit 112 includes, for example, a diode amplitude detector or similar means for deriving a control signal representative of the amplitude of the chrominance signals from unit 111. Filter unit 113 comprises a low-pass filter with a bandpass characteristic of from DC (zero hertz) to about 500 KHz. Filtered control signals are coupled to a control input of difference network 118 for controlling the signal gain thereof. The filtered control signal from filter 113 may also be coupled to a gain control input of summing network 116.

Figure 4:
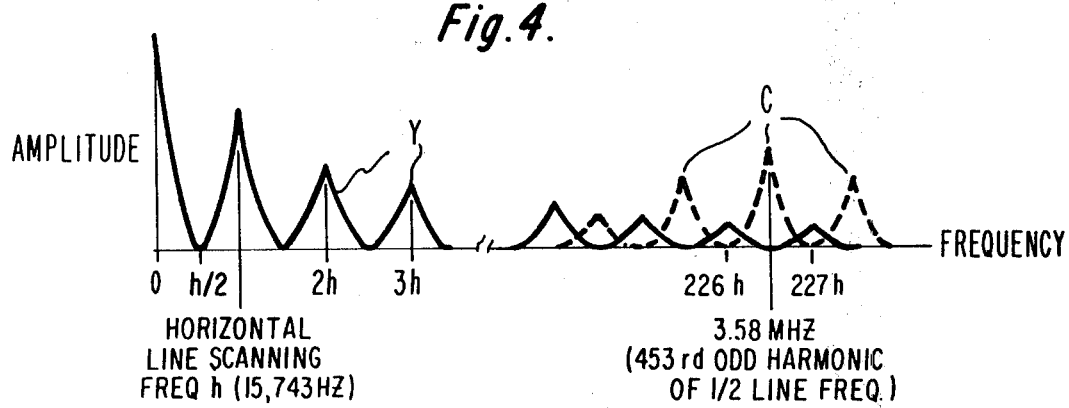
FIG. 4 illustrates a frequency spectrum of a portion of a video signal associated with the operation of the invention.

In operation, video signals from video signal processing unit 12 include chrominance and luminance components arranged within the frequency spectrum as shown in FIG. 4. The luminance component has a relatively wide bandwidth (extending from D.C. or zero frequency to about 4 MHz). The upper frequency range of the luminance component is shared with the chrominance component, which comprises a subcarrier signal of 3.58 MHz amplitude and phase modulated with color information.

Delay device 110 delays the video signal from source 12 by a time substantially equal to one horizontal line scanning period (1/h). The delayed video signal of path A may be characterized relative to the undelayed video signal of path B as a preceding video signal associated with a preceding horizontal line of a particular scanning field. Signal paths A and B will be assumed to exhibit substantially equal signal gains of unity in this case.

Figure 5:
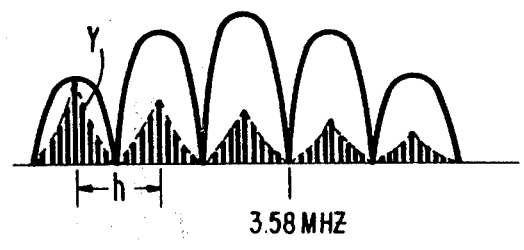
FIG. 5 illustrates an output signal frequency response characteristic of a typical comb filter.

The delayed and undelayed video signals are combined by network 116 to provide a separated luminance component, having a maximum response at integral multiples of the line scanning frequency (h), from which the chrominance component has been removed (see FIG. 5). This results because the chrominance components of video signals of adjacent horizontal lines of a particular scanning field are relatively antiphase. The chrominance component of the preceding video signal (path A) and the antiphase chrominance component of the present video signal (path B) therefore substantially cancel, and the relatively in-phase luminance components reinforce, when summed in network 116.

Figure 6:
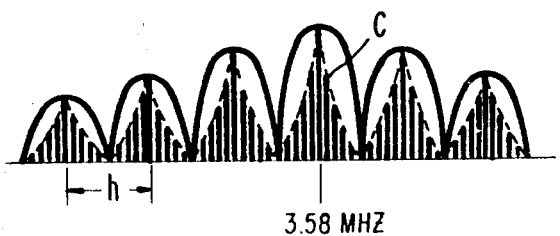
FIG. 6 illustrates a further output signal frequency response characteristic of a typical comb filter.

Comb filter 100 also provides a separated chrominance component, having a maximum response at the frequency of the chrominance subcarrier signal and at odd multiples of one-half of the line scanning frequency (h), at the output of combining network 118. The output signal of network 118 consists substantially only of the chrominance component from which the luminance component has been removed (see FIG. 6). In this case, the relatively in-phase luminance components of video signals of adjacent horizontal lines of a particular scanning field cancel, while the antiphase chrominance components reinforce, when subtracted in difference combining network 118. Thus, the output of network 116 contains separated luminance signal information free of interference from color information (e.g., dots), and the output of network 118 contains separated chrominance signal information free of cross-modulation from high frequency luminance information.

Comb filter 100 provides separated luminance and chrominance components to the relative exclusion of each other, as described above, when the chrominance components of adjacent horizontal lines are correlated with respect to both phase (hue) and amplitude (saturation). However, the operation of comb filter 100 tends to impair the color definition and quality of a reproduced color image when the chrominance components of the delayed and undelayed video signals differ in amplitude or phase or both.

First consider the luminance output signal of network 116. When the chrominance components of the delayed and undelayed signals differ perceptibly in amplitude or phase, the chrominance components do not cancel completely when summed by network 116. The incomplete chrominance cancellation causes the luminance signal output of network 116 to be contaminated by modified chrominance information. Such contamination is manifested by a horizontal dot pattern in a reproduced image. This pattern is particularly objectionable where there are transitions from a color image area to, for example, a white image area.

A related, objectionable signal condition occurs with respect to the chrominance output signal provided by network 116 when the chrominance components of the delayed and undelayed video signals differ in phase or amplitude. For example, when the delayed video signal contains color information and the undelayed video signal does not contain color information, the output signal of difference combining network 118 will be undesirably contaminated by the color information of the delayed signal when the delayed and undelayed signals are combined by network 118. The output signal of network 118 also will be contaminated by the color information of the delayed video signal when the delayed and undelayed signals are of perceptibly different hue (phase). The normally expected reinforcement of amplitude and phase correlated delayed and undelayed chrominance components is somewhat degraded in both cases.

Gain control network 115 serves to reduce the aforementioned adverse effects produced by uncorrelated chrominance components. Frequency selection unit 111 selectively passes the contaminating chrominance component when present in the luminance signal output of network 116. Detection unit 112 detects the amplitude of such chrominance component when above a predetermined level, and provides a control signal represntative of the magnitude of the chrominance component. Filter 113 removes unwanted high frequency components from the control signal prior to application thereof to the gain control input of network 118. The control signal so developed serves to reduce the gain of network 118 in a manner to suppress the undesired visual impression ultimately created by the uncorrelated chrominance components. Filtered gain control signals may also be connected to the gain control input of network 116 to reduce the gain thereof and thereby reduce the effect of the chrominance components which contaminate the output luminance signal.

The adverse effects produced by a comb filter arrangement in response to uncorrelated chrominance components can therefore be reduced by gain controlling one or both of the sum and difference combining networks of the comb filter in the manner discussed. Color fidelity is enhanced and vertical color resolution is improved.

Figure 2:
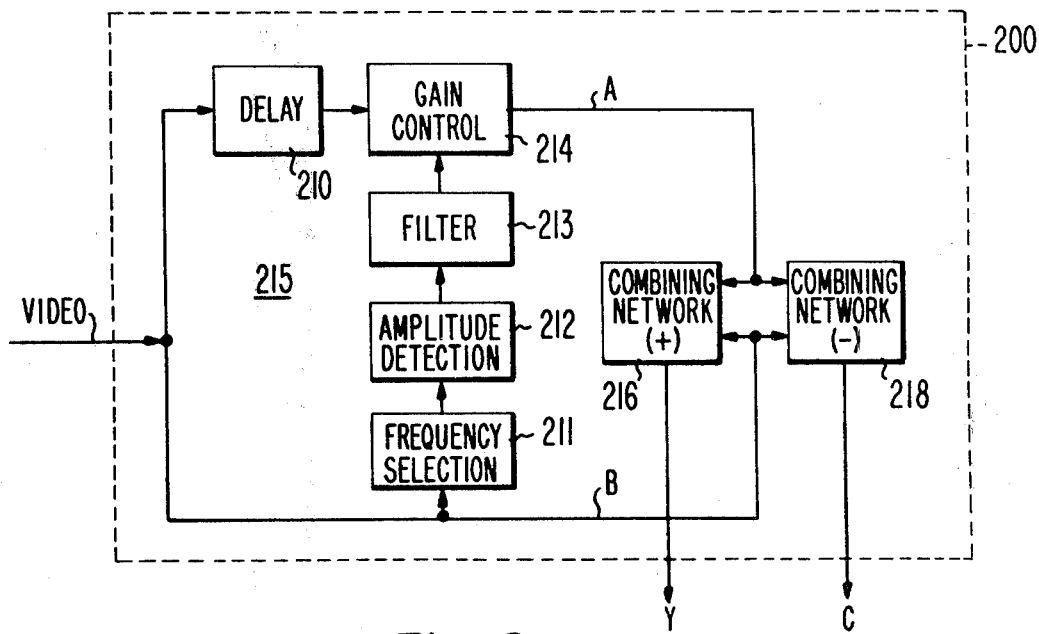
FIG. 2 illustrates an alternate embodiment of a comb filter according to the invention.

FIG. 2 illustrates an alternate embodiment of the invention which is specifically directed to suppressing the effects of so-called "following dot" and related phenomena on the quality of a reproduced color image. Comb filter 200 of FIG. 2 comprises a gain control network 215 including a frequency selection unit 211, an amplitude detection unit 212, a filter unit 213 and a gain control unit 214 arranged in cascade between a direct signal path B and a delayed signal path A of comb filter 200. Frequency selection unit 211, detection unit 212 and filter unit 213 are similar in form and function to corresponding units 111, 112, and 113 of comb filter 100 of FIG. 1. The comb filter arrangements of FIGS. 1 and 2 differ in the manner in which the respective arrangements are gain controlled.

Comb filter 200 additionally includes gain control unit 214. Unit 214 is coupled in the delayed signal path A of comb filter 200, and serves to modify the signal gain of path A. Delayed video signal is coupled to a signal input of control unit 214, and a filtered gain control signal is coupled via filter 213 to a control input of unit 214. Control unit 214 may comprise, for example, a controllable gain transistor amplifier having gain control signal applied to a base control electrode, delayed video signal applied to an emitter signal input electrode, and a collector output electrode.

In this embodiment, it will be assumed that delayed signal path A and undelayed signal path B each normally exhibit unity signal gain. Comb filter 200 operates in this normal gain condition when a delayed video signal of path A and an undelayed video signal of path B contain chrominance components of substantially equal amplitude above a predetermined level (i.e., the chrominance components are amplitude correlated). For this condition, units 211–213 provide a control signal which causes gain control unit 214 and thus signal path A to exhibit maximum signal gain of unity.

In the absence of control network 215, a "following dot" pattern and related adverse effects result when the amplitude of the chrominance component of the delayed video signal exceeds the amplitude of the chrominance component of the undelayed video signal by a perceptible amount. The adverse effects are especially pronounced when the delayed video signal contains chrominance components and the undelayed video signal is devoid of chrominance components.

In such cases, the chrominance components of unequal amplitude do not cancel when summed by combining network 216. Incomplete cancellation of the chrominance components causes the luminance output signal of network 216 to be contaminated by color information. Such contamination is manifested in a reproduced image by a horizontal dot pattern (i.e., "following dots"). Similarly, the output signal of difference combining network 218 will be contaminated by the color information of the preceding chrominance component when the delayed and undelayed video signals are combined by network 218. In both cases, the amount and visibility of contamination is directly related to the amount by which the magnitude of the preceding chrominance component of the delayed video signal exceeds the magnitude of the chrominance component of the undelayed video signal.

Gain control network 215 serves to reduce or eliminate the aforementioned color contamination by proportionally controlling the signal gain of path A of comb filter 200 in response to the magnitude of a chrominance component of path B. Thus when the magnitude of the undelayed chrominance component is less than a predetermined level, the control signal from detection unit 212 serves to correspondingly reduce the gain of gain control unit 214. The signal gain of path A is therefore reduced. The control signal also serves to render gain control unit 214 substantially non-conductive when the undelayed video signal does not contain a chrominance component. The amount of color information coupled to combining networks 216, 218 and therefore the amount of color contamination of the output signals of combining networks 216, 218 is controllably reduced or eliminated accordingly.

Figure 3:
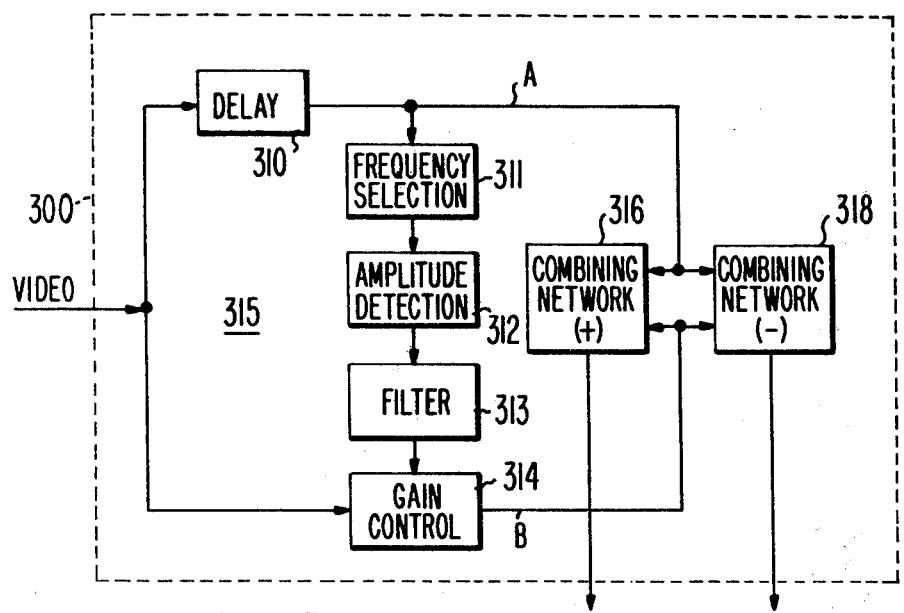
FIG. 3 illustrates a further embodiment of a comb filter according to the invention.

Comb filter 300 of FIG. 3 is generally similar to comb filter 200 of FIG. 2. Comb filter 300 serves to suppress the effects of so-called "preceding dot" phenomenon on the quality of a reproduced color image.

Elements 311–314 of comb filter 300 correspond in form and function to elements 211–214 of comb filter 200, except that the relative positions of units 211, 214 and 311, 314 are interchanged. A gain control unit 314 is coupled in a direct (undelayed) signal path B of comb filter 300, and serves to modify the signal gain of path B and thereby the operation of comb filter 300. Undelayed video signal is coupled to a signal input of control unit 314, and a filtered gain control signal from filter 313 is applied to a control input of unit 314.

Comb filter 300 operates normally when a delayed video signal of path A and an undelayed video signal of path B contain chrominance components of substantially equal amplitude above a predetermined level. Units 311–313 then provide a control signal which causes gain control unit 314 and thus signal path B to exhibit a maximum signal gain of unity.

In the absence of control network 315, the "preceding dot" pattern results when the amplitude of the chrominance component of the undelayed video signal exceeds the amplitude of the chrominance component of the delayed video signal by a perceptible amount. The dot pattern is especially pronounced in a reproduced color image when the undelayed video signal contains chrominance components and the delayed video signal is devoid of chrominance components.

The relatively antiphase chrominance components of the delayed and undelayed video signals, being of unequal amplitude, do not cancel when summed by combining network 316. Incomplete cancellation of the chrominance components causes the luminance output signal of network 316 to be contaminated by color information, which is manifested in a reproduced image by the "preceding dot" horizontal dot pattern. The amount and visibility of color contamination is directly related to the amount by which the magnitude of the preceding chrominance component of the undelayed video signal exceeds the magnitude of the undelayed chrominance component of the delayed video signal.

Gain control network 315 reduces or eliminates the aforementioned color contamination by controlling the signal gain of path B of comb filter 300 in response to the magnitude of a preceding chrominance component of path A. Thus when the magnitude of the preceding chrominance component is less than a predetermined level, the control signal from detection unit 312 correspondingly reduces the gain of gain control unit 134 and therefore the signal gain of path B. The magnitude of the chrominance component coupled via signal path B and therefore the magnitude of the reproduced dot pattern are reduced accordingly.

It is noted that the luminance signal (Y) output of comb filter 100 of FIG. 1 has been subjected to a "combing" effect over its entire band. The combing action over the high frequency band portion which is shared with chrominance signal components has the desired result of deleting chrominance signal components. Extension of this combing action into the low frequency band portion which is not shared with chrominance signal components, however, is not needed to effect the desired removal of chrominance signal components, and serves only to unnecessarily delete luminance signal components. Components in the lower end of this unshared band which are subject to such deletion are representative of "vertical detail" luminance information. Preservation of such "vertical detail" information is desirable to avoid loss of vertical resolution in the luminance content of the displayed image.

Figure 7:
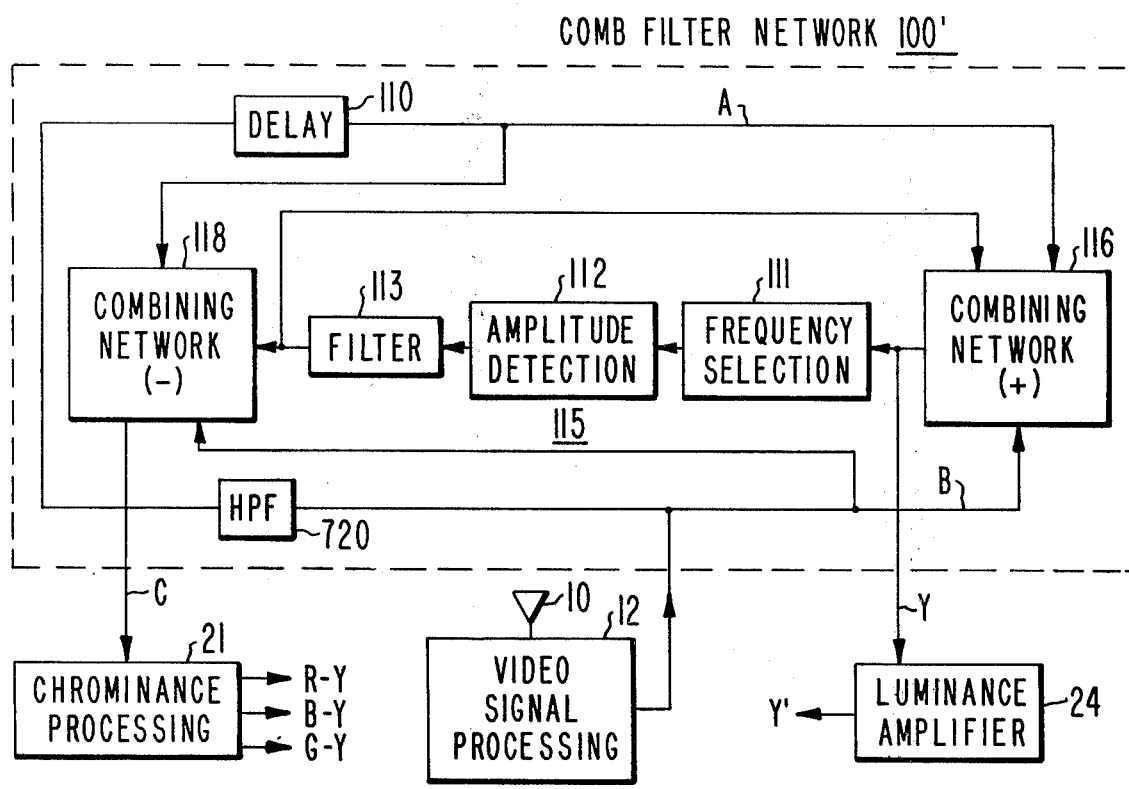
FIGS. 7 and 8 illustrate modifications of the comb filter shown in FIG. 1.

FIG. 7 illustrates a modification of the embodiment of FIG. 1 whereby the purposes of the FIG. 1 arrangement may be served without sacrifice of the aforementioned "vertical detail" information. The comb filter network 100′ of FIG. 7 is identical to the network 100 of FIG. 1 except that a high pass filter 720 has been added. High pass filter 720 is arranged to pass to delay device 110 only those frequencies of the composite video signal from unit 12 that fall above a cut-off frequency selected to lie below the band occupied by the chrominance signal component of the composite video signal. With suitable choice of the cut-off frequency (e.g., just below 2 MHz), passage to the delay channel of signal components in the band occupied by vertical detail information is precluded, and the combing action produced by the combination of delayed and undelayed signals in network 116 is confined to frequencies above the selected cut-off frequency.

The luminance output signal Y from summing network 116 in FIG. 7 therefore comprises a "combed" portion, including signal frequencies above the selected cut-off frequency, from which chrominance information has been removed, and an "uncombed" portion comprising luminance signal components, of frequencies below the selected cut-off frequency, which have been passed by the undelayed channel only. The uncombed luminance signal portion includes the vertical detail information desired to be preserved.

It is noted that filter 720 alternatively can be arranged as a bandpass filter to pass, for example, only those signal frequencies which fall within the band encompassed by the chrominance signal component of the composite video signal. Vertical detail content of the separated luminance signal is substantially preserved in this instance as well.

Figure 8:
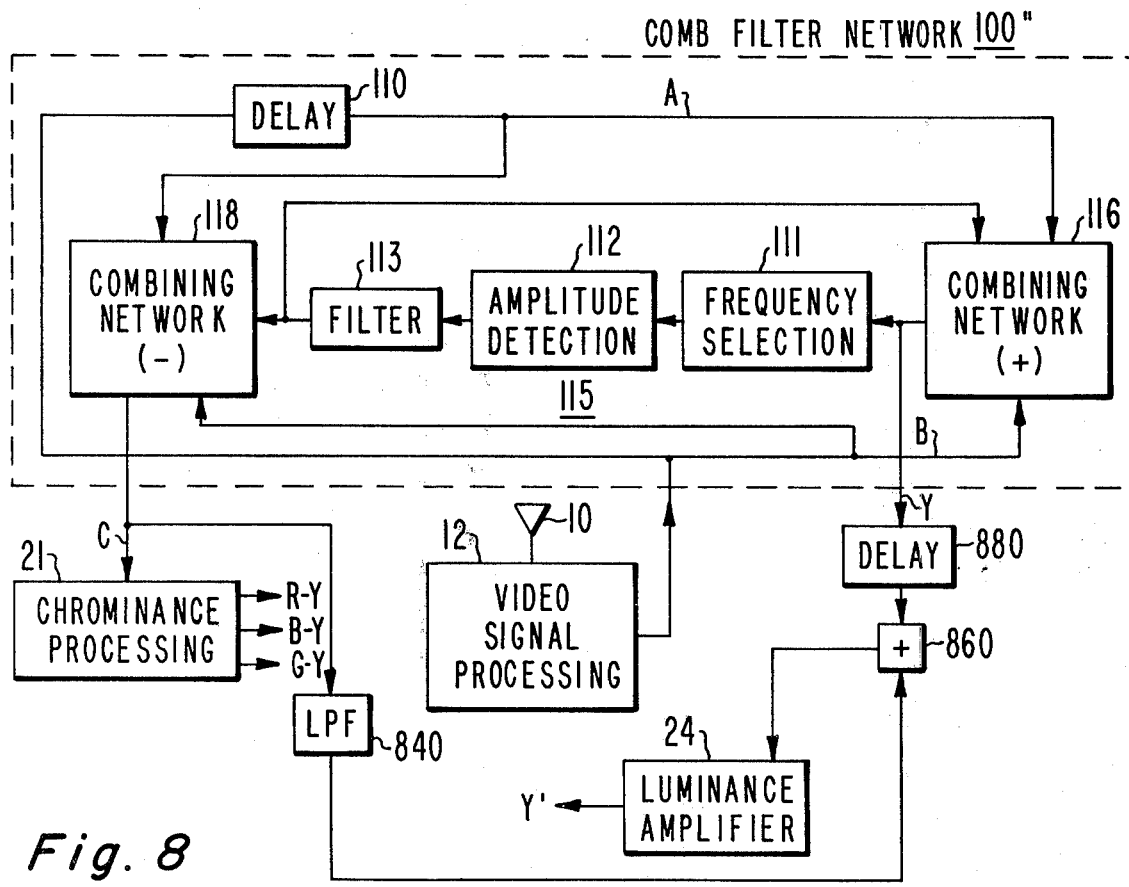

Other arrangements for preserving vertical detail content of the separated luminance signal are possible, as demonstrated, for example, in FIG. 8. The comb filter network 100″ of FIG. 8 differs from the network 100 of FIG. 1 by the addition of a low pass filter 840 coupled to an output of the subtractive combining network 118, and by the addition of an additional summing network 860, supplied at one input with the combed output from summing network 116 (via an added delay device 880), and supplied at another input with the output of low pass filter 840. The cut-off frequency of low pass filter 840 lies below the band occupied by the chrominance signal component of the composite video signal (with an illustrative choice being just below 2 MHz, as in FIG. 7). The delay imparted by the added delay device 880 is chosen to substantially match signal delay introduced by filter 840. The combined signal appearing at the output of the additional summing network 860, and supplied therefrom to luminance amplifier 24, includes (as in FIG. 7) a "combed" high frequency portion (occupying a band of frequencies above the cut-off frequency) from which chrominance signal components have been removed, and an uncombed low frequency portion in which all luminance signal components have been preserved.

The FIG. 8 arrangement differs from the FIG. 7 arrangement in avoiding introduction of a high frequency peaking effect that is a consequence of the FIG. 7 arrangement which may not be desired in all circumstances. That is, in FIG. 7, the high frequency components passed to amplifier 24 correspond to the sum of two reinforcing contributions (from the delayed and undelayed channels), whereas the low frequency components represent a single contribution (from the undelayed channel only). Thus components of the input to amplifier 24 which lie above the cut-off frequency of filter 720 are enhanced in amplitude relative to the components which lie below said cut-off frequency. Where such a peaking effect is not desired, the FIG. 8 arrangement is preferable. In the FIG. 8 arrangement, there is not such relative enhancement of high frequency components.

It will be appreciated that the circuit arrangements of FIGS. 2 and 3 may also be modified in manners similar to the above-discussed modifications of FIG. 1, for vertical detail preservation purposes.

Although the invention has been disclosed in terms of particular embodiments, it should be appreciated that other arrangements may be devised by those skilled in the art without departing from the scope of the invention. Thus although the embodiments of the invention have been described as being employed for separating luminance and chrominance components of a color television video signal, it will be apparent that the present invention is also applicable to apparatus for separating components of other signal transmission systems having such components in frequency interleaved relation.

What is claimed is:

1. Apparatus for processing a video signal containing image-representative luminance and chrominance components disposed within a frequency spectrum of said video signal in frequency interleaved relation, said chrominance component alternating in phase each horizontal line scanning interval, said apparatus comprising:

comb filtering means including means for delaying said video signal for a time period corresponding to said interval, and means for additively and subtractively combining said video signal and said delayed video signal, to provide relatively separated luminance and chrominance components, said comb filter means including at least one gain controllable element;

control means having an input coupled to said comb filter means and responsive to signal components having frequencies in the range of said chrominance signals for providing a control signal representative of the magnitude of signal components in said frequency range; and means for coupling said control signal to said gain controllable element for controlling the signal gain thereof in accordance with the magnitude of said signal components to reduce the effect of uncancelled chrominance signal components on a reproduced image.

2. Apparatus for processing a video signal containing image-representative luminance and chrominance components disposed within a frequency spectrum of said video signal in frequency interleaved relation, said chrominance component alternating in phase each horizontal line scanning interval, said apparatus comprising:

comb filtering means including means for delaying said video signal for a time period corresponding to said interval;

a signal summing network included in said comb filtering means, having first and second inputs respectively coupled to said video signal and to said delayed video signal, and an output for providing a separate luminance component;

a gain controllable difference signal network included in said comb filtering means, having first and second inputs respectively coupled to said video signal and to said delayed video signal, an output for providing a separated chrominance component, and a gain control input;

control means having an input coupled to said comb filter means and responsive to signal components having frequencies in the range of said chrominance signals for providing a control signal representative of the magnitude of signal components in said frequency range; and means for coupling said control signal to said gain control input for controlling the signal gain of said difference signal network in accordance with the magnitude of said signal components to reduce the effect of uncancelled chrominance signal components on a reproduced image.

3. Apparatus according to claim 2, wherein:
said input of said control means is coupled to said output of said summing network.

4. Apparatus according to claim 3, wherein:
said summing network additionally has a gain control input, and said gain controllable element additionally is included in said summing network; and
said control signal is additionally coupled to said gain control input of said summing network for controlling the signal gain thereof in accordance with the magnitude of said signal components.

5. Apparatus according to claim 4, wherein said control means comprises:
frequency selection means coupled to said output of said summing network, for selectively passing said signal components when present at said output of said summing network; and
amplitude detection means coupled to said frequency selection means for providing said control signal representative of the amplitude of said signal components.

6. Apparatus according to claim 5 and further comprising:
low pass filter means coupled to said amplitude detection means for filtering said control signal.

7. Apparatus according to claim 1, wherein:
said video signal is coupled to said combining means via a first signal path and said delayed video signal is coupled to said combining means via a second signal path;
said input of said control means is coupled to one of said first and second signal paths for providing a control signal representative of said signal components; and
said gain controllable element has an input for receiving signals coupled via the other of said signal paths, an output coupled to said combining means, and being responsive to said control signal for controlling the signal gain of said other path in accordance with the magnitude of said signal components.

8. Apparatus according to claim 7, wherein said control means comprises:
frequency selection means coupled to said one or the other of said signal paths, for selectively passing said signal components when present in said one or the other of said signal paths; and
amplitude detection means coupled to said frequency selection means for providing said control signal representative of the amplitude of said signal components.

9. Apparatus according to claim 8 and further comprising:
low pass filter means coupled to said amplitude detection means for filtering said control signal.

10. Apparatus according to claim 9 wherein:
said video signal comprises a video signal in conformity with NTSC television system standards.

* * * * *